INVENTORS
GABRIEL M. GIANNINI
ADRIANO C. DUCATI

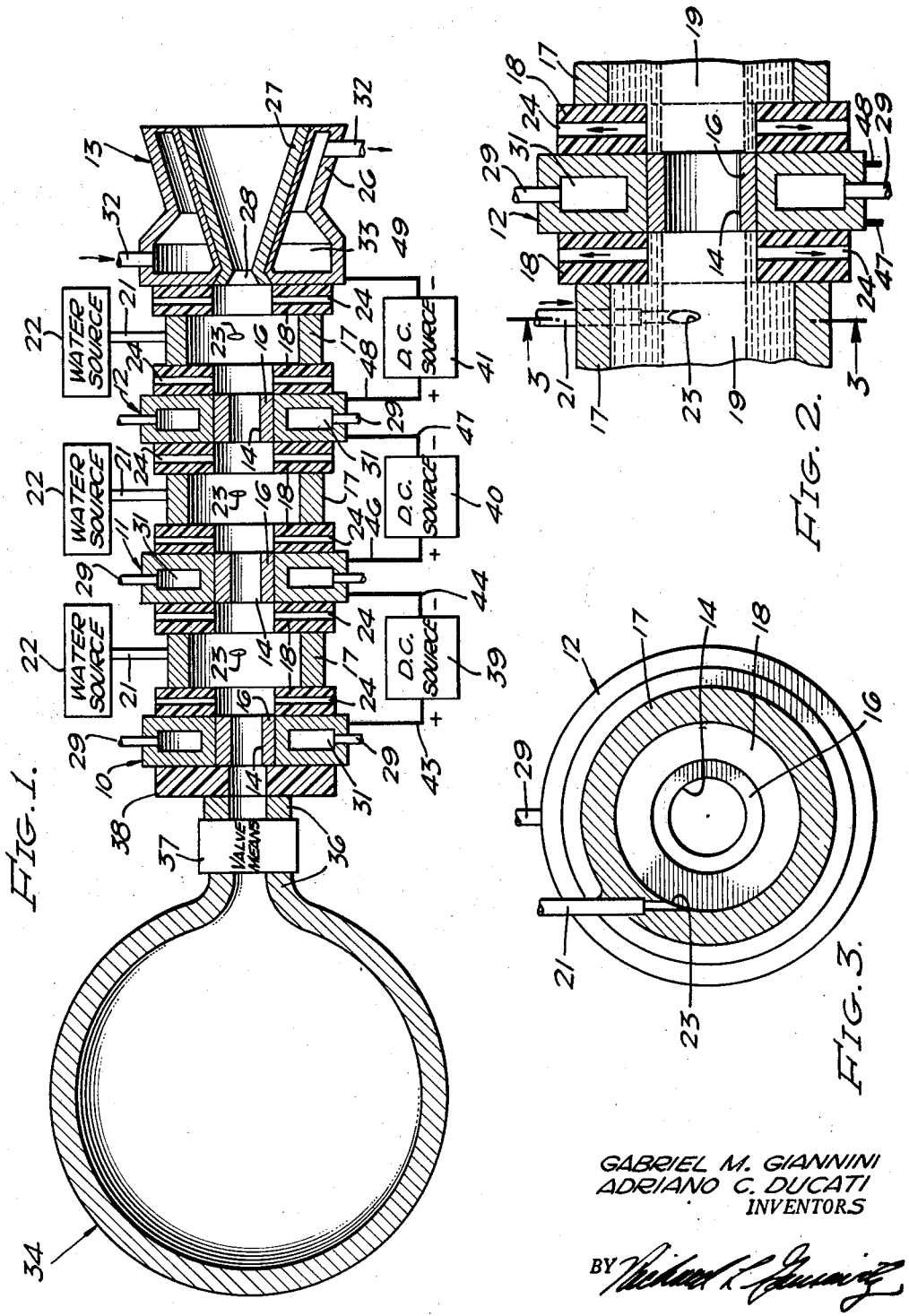

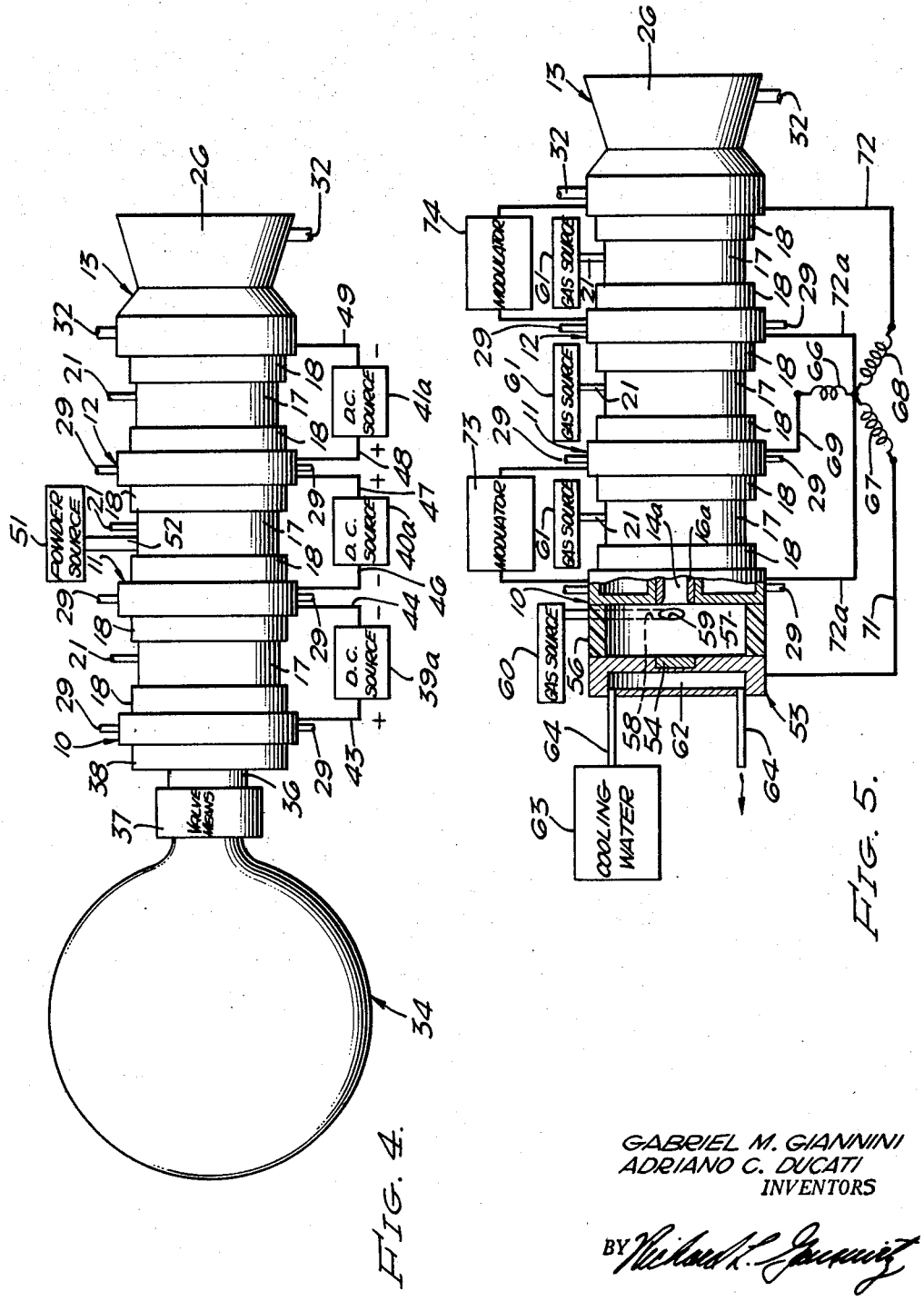

BY

ATTORNEY.

United States Patent Office 3,149,222
Patented Sept. 15, 1964

3,149,222
ELECTRICAL PLASMA-JET APPARATUS AND METHOD INCORPORATING MULTIPLE ELECTRODES
Gabriel M. Giannini, Indio, and Adriano C. Ducati, Newport Beach, Calif., assignors, by mesne assignments, to Giannini Scientific Corporation, Long Island, N.Y., a corporation of Delaware
Filed Aug. 21, 1962, Ser. No. 219,366
26 Claims. (Cl. 219—121)

This invention relates to an apparatus and method for generating and maintaining an electrical plasma jet through the use of more than two electrodes. The invention also relates to methods of cutting, welding, etc., through use of more than two electrodes. This application is a continuation-in-part of our co-pending application Serial No. 86,204, filed January 31, 1961, now abandoned, for an Electrical Plasma-Jet Apparatus and Method Incorporating Multiple Electrodes. Said application is a continuation-in-part of abandoned application Serial No. 768,255, filed October 20, 1958.

It is an object of the present invention to provide an apparatus and method making use of more than two electrodes for achieving extremely high plasma temperatures and/or velocities, and for performing useful methods including cutting, welding and spraying.

Another object is to provide an apparatus and method wherein a high-current arc is maintained between a workpiece and the nozzle electrode of a plasma torch.

An additional object is to provide an apapratus and method for fusing a portion of an electrically-conductive workpiece by means of a transfer arc circuit including such workpiece, and without effecting blasting or blowing of the molten workpiece metal to undesired locations.

A further object is to provide a plasma-torch method and apparatus for heating an electrically-conductive workpiece, and utilizing a transfer arc circuit which may be controlled in an efficient manner and independently of the power supply to the torch arc.

A further object of the invention is to provide a method and apparatus for effecting modulation of plasma to thus achieve desired results including modulation of large currents.

Another object of the invention is to provide a method and apparatus for melting or vaporizing highly refractory substances.

A further object of the invention is to provide a method and apparatus for maintaining an electrical plasma jet or plasma flame through the use of multi-phase alternating current.

These and other objects and advantages of the invention will be more fully set forth in the following specification and claims, considered in connection with the attached drawings to which they relate.

In the drawings:

FIGURE 1 is a schematic longitudinal sectional view illustrating a first form of apparatus constructed in accordance with the present invention;

FIGURE 2 is an enlarged fragmentary longitudinal sectional view corresponding to a central portion of the showing of FIGURE 1;

FIGURE 3 is a transverse section taken on line 3—3 of FIGURE 2;

FIGURE 4 is a side elevation showing an apparatus of the type shown in FIGURE 1, but associated with means for introducing a fluid or particulate substance into the plasma;

FIGURE 5 is a schematic view, partially in side elevation and partially in longitudinal central section, showing an additional form of apparatus incorporating a multi-phase power supply and also incorporating means to effect modulation of the plasma jet or flame;

Figure 6:
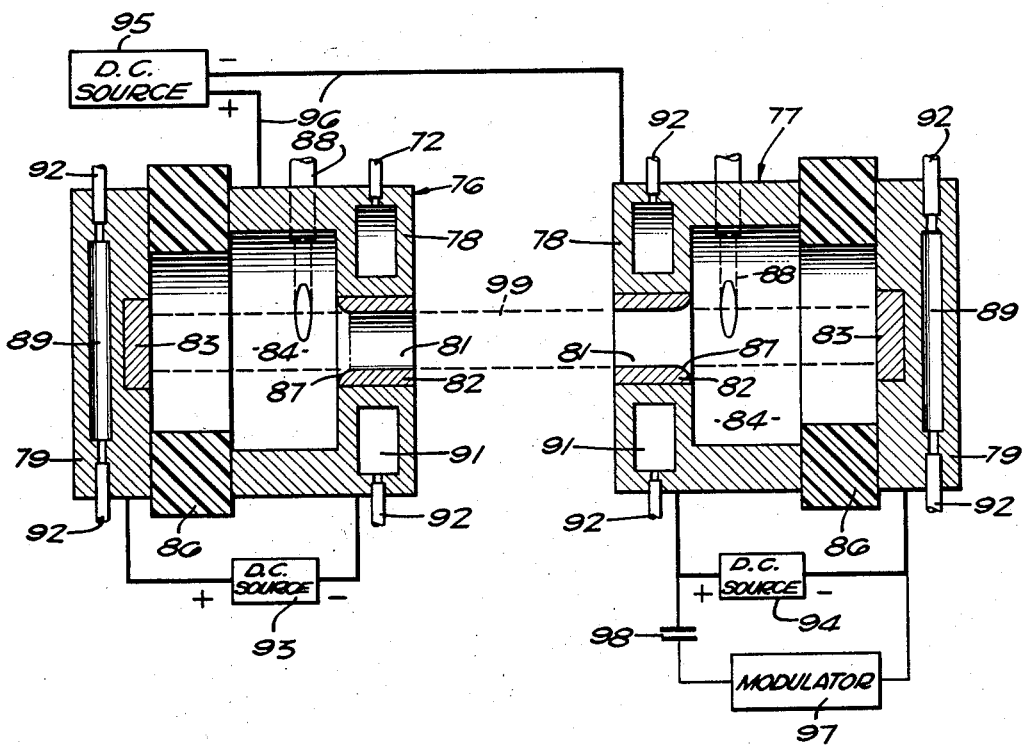
FIGURE 6 is a schematic longitudinal central sectional view illustrating a form of apparatus in which a transfer arc is maintained between the nozzle electrode of at least one torch and an electrode external to such torch.

Proceeding first to a description of FIGURES 1-3, inclusive, a first embodiment of the invention is illustrated schematically as comprising a plurality of ring or disc-shaped electrodes 10–12 and a nozzle electrode 13 all mounted in spaced, coaxial relationship. Each electrode 10–12 is formed of highly conductive metal and has a cylindrical opening 14 formed coaxially thereof, the wall of the opening being protected by a tubular insert 16 formed of a refractory metal such as tungsten. Provided in the space between each set of electrodes 10–13, and coaxially thereof, are a metal tube 17 and two annular elements 18 formed of insulating material. The insulators 18 are shown as having axial cylindrical openings the diameters of which are approximately the same as the outer diameters of tubular inserts 16, but are substantially smaller than the inner diameter of each metal tube 17. Elements 18 may also be formed of metal, such as tungsten, suitably insulated from the adjacent electrodes.

Fluid is introduced into the spaces between the electrodes 10–13 in such manner as to define fluid passages, canals or pipes, indicated at 19 in FIGURE 2, between openings 14. More specifically, water is introduced tangentially through the wall of each tube 17, into the space between adjacent annular insulators 18, by means of a pipe 21 connected to a suitable water source 22. The water enters through a tangential inlet opening 23 at sufficient velocity to flow vortically and define the fluid passage or canal 19 which comprises the vortex in the whirling water. As best shown in FIGURE 2, the whirling water flows outwardly through radial passages 24 provided in the insulators 18. The arrangement is such that the diameter of each fluid passage or canal 19 is larger than the internal diameter of each tubular insert 16, so that the wall of the latter is not covered with water. Suitable means, not shown, are provided to collect the water which flows outwardly through passages 24.

The nozzle electrode 13 is shown as comprising a water jacket 26 around a liner element 27, the jacket 26 being formed of a suitable highly-conductive metal and the liner being formed of a refractory metal such as tungsten. The liner element 27 may have various shapes and, where high velocities are desired, is shaped as a Laval nozzle. The inlet to the nozzle opening 28 defined by liner element 27 is shown as having approximately the same diameter as the inner diameter of each tubular insert 16, so that no water will enter the nozzle opening.

Conduit means 29 are provided to pass water through annular chambers 31 formed in each electrode 10–12 to thereby effect cooling thereof. Correspondingly, conduit means 32 are provided to pass water through the chamber 33 within water jacket 26.

A source of gas, indicated as a pressure tank 34, communicates through a pipe portion 36 with the opening 14 in the electrode 10 most remote from nozzle 13. Suitable valve means 37 are provided to control the flow of gas into the opening 14 in electrode 10, and a suitable insulator 38 is provided between the pipe 36 and electrode 10. The pressure tank 34 may contain argon, helium, nitrogen, compressed or liquid air, and various other gases under relatively high pressure.

Means are provided to impress voltages between various ones of the electrodes 10–13, and are illustrated schematically to comprise three direct current sources 39–41 capable of supplying relatively high currents on the order of hundreds of amperes or more. Source 39 is connected through leads 43 and 44 to electrodes 10 and 11, respectively; source 40 is connected through leads 46 and 47 to the electrodes 11 and 12, respectively; and source 41 is connected through leads 48 and 49 to electrodes 12 and 13. In the illustrated embodiment, the sources are so connected that leads 43, 46 and 48 are positive, and leads 44, 47 and 49 are negative. The electrodes are thus connected in aiding relationship and serve the purpose of increasing the velocity of particles passing through fluid passages 19 and openings 14 from electrode 10 to electrode 13. The sources 39–41 may be so adjusted that the impressed voltages are progressively increased longitudinally of the apparatus.

*Method Relative to the Embodiment Shown in FIGURES 1–3*

Stated generally, and with reference to the embodiment shown in FIGURES 1–3, the method comprises providing more than two electrodes, maintaining electric arcs between the electrodes to generate plasma, and discharging the plasma from the apparatus to provide desired results as will be indicated subsequently. The method further includes effecting fluid constriction of the arcs to thereby increase the current densities and temperatures thereof. Also, the method includes passing gas or vapor axially through the apparatus, and effecting acceleration of the plasma during its discharge from the last of the multiple electrodes.

With relatively specific reference to the embodiment of FIGURES 1–3, the method comprises effecting flow of water from sources 22 through pipes 21 and inlet openings 23 tangentially into tube elements 17, so that the water flows vortically to define the passages or pipes 19 (FIGURE 2) after which it discharges radially through passages 24. The current sources 39–41 are then turned on, and high-current electric arcs are suitably initiated between electrodes 10 and 11, electrodes 11 and 12, and electrodes 12 and 13. These arcs are constricted to the vortexes or passages 19 in the whirling water, and therefore have substantially smaller cross-sectional areas than they would normally occupy in space. The result is that the arcs have extremely high current densities and temperatures. The arcs may be initiated in a number of ways, including momentarily impressing a high frequency or voltage between two or more of the electrodes.

The high-current electric arcs between the various electrodes effect discharge of the plasma through the nozzle opening 28, the plasma being composed of ions, free electrons and water vapor. The plasma increases in velocity at the opening 28 because of the shape thereof with the indicated throat or constriction.

The valve means 37 are then opened to effect flow of high-pressure gas from the pressure tank 34 through the opening 14 in the first electrode 10 and thence through the water passages 19 and the other electrode openings 14 to and through nozzle opening 28. This has the effect of increasing the velocity of the plasma and changing the composition thereof in desired ways. For example, the expansion of liquid air from tank 34 through the apparatus, in combination with the acceleration effect produced by the current sources 39–41 and the acceleration action produced by the nozzle electrode 13, results in the discharge of plasma having an extremely high velocity. The apparatus may therefore be employed to generate the extremely high velocities required in such arts as aerodynamic testing. The method may include evacuating the space outside nozzle opening 28, so that the plasma discharges into a substantial vacuum.

In order to conserve the electrodes and prevent rapid deterioration of the inserts 15 and liner 27, the gas may be inert or oxidation-preventing, and the water sources 22 may be replaced by sources of oxidation-preventing gases such as argon or helium.

Where the reaction of a test object to air flow is to be studied, the sources 34 and 22 may contain air under pressure. The test object may then be mounted in a substantially evacuated chamber in front of and communicating with nozzle opening 28.

*Embodiment of FIGURE 4*

The apparatus illustrated in FIGURE 4 is identical to that described with reference to FIGURES 1–3, and has been given the same reference numerals except as will be specifically noted.

In the embodiment of FIGURE 4, the polarity of at least one of the D.C. current sources 39a, 40a and 41a is reversed relative to the polarity of the others. For example, the polarity of source 40a may be the opposite of that of source 40 shown in FIGURE 1, so that lead 46 is negative and lead 47 is positive. Sources 39a and 41a are connected the same as sources 39 and 41 in FIGURE 1, with leads 43 and 48 positive and leads 44 and 49 negative. Source 40a is therefore connected in bucking relationship relative to sources 39a and 41a.

A source of particulate or fluid substance, for example powdered refractory material, is indicated at 51 as connected through a pipe 52 with an inlet, not shown, into the plasma stream within the torch. For example, the pipe 52 may communicate with an inlet ring disposed axially adjacent one of the tubular inserts 16 and having inlet openings into the plasma. Powder may then be carried from source 51 by means of a suitable carrier gas, and introduced into the plasma stream for heating and vaporizing or melting thereby. In this way, highly refractory substances may be readily melted or vaporized for various purposes including spraying onto a base element. The substance to be heated may also be brought into contact with the plasma in other ways, such as by being introduced into the gas passing through pipe 36.

In situations where it is desired to achieve extremely high temperatures without achieving extremely high plasma velocities, the nozzle 13 may be replaced by an electrode, not shown, which does not have a nozzle construction adapted to increase plasma velocity.

*Method with Relation to the Embodiment of FIGURE 4*

The method with relation to the embodiment of FIGURE 4 is the same as that described with reference to FIGURES 1–3, except that, as specified above, the polarity of at least one of the sources (numbered 40a in the present example) is reversed. Furthermore, powder is introduced from source 51 through pipe 52 into the plasma stream for melting or vaporizing thereby and discharge through the nozzle 13 or through another nozzle element which is not adapted to increase plasma velocity.

The substance thus melted or vaporized may be applied onto a workpiece to form a coating thereon. Also, the apparatus may be employed in the purifying or refining of substances by effecting selective condensation of various materials vaporized and/or dissociated by the high-temperature plasma.

*Embodiment of FIGURE 5*

The structure of the portion of the embodiment of FIGURE 5 from the electrode 10 to the right is the same as was described with relation to FIGURES 1–3, except as will be specifically noted. Corresponding reference numerals have been used for corresponding parts.

In the embodiment of FIGURE 5, the gas source 34 is omitted, and an additional electrode 53 is mounted coaxially at the left of electrode 10. Electrode 53 is disc-shaped and is provided at its imperforate central portion with an insert 54 formed of a refractory metal such as tungsten. A tubular insulator 56 is mounted coaxially between electrode 53 and electrode 10 to define a sealed chamber 57 coaxially therebetween and having an annular shape. Gas is introduced into the chamber 57 through tangential passage means 58 terminating in an inlet opening 59. The gas flows from a pressure source 60 at sufficient velocity that it whirls vortically in chamber 57 and then passes into the opening 14a in electrode 10. This flow is relatively smooth and free from shock and turbulence, there being a rounded edge provided at the end of the tubular insert 16a which is adjacent electrode 53.

The water sources 22 of FIGURE 1 are replaced, in the embodiment of FIGURE 5, by gas or vapor sources 61 which communicate with the tangential pipes 21 previously described with reference to FIGURES 1–3. Gas therefore flows from the gas sources 61 into the chambers between the sets of electrodes 10–11, 11–12, and 12–13, in which chambers it flows vortically and is then discharged through passages 24. It is to be understood, however, that the discharge passages 24 may be modified (or omitted) in such manner that substantially all the gas from sources 61 will form a part of the plasma transmitted to the nozzle 13. However, the gas flow should not be such that the insulation effect upon the refractory tubes 16 is sufficient to prevent striking of arcs therebetween.

The electrode 53 is provided with a suitable cooling chamber 62 through which water is passed from a source 63 by conduit means 64.

A suitable source of multi-phase alternating current is represented as a Y-connected source having three legs 66–68. Leg 66 is connected through a suitable lead 69 to electrode 11; leg 67 is connected through lead 71 to electrode 53; and leg 68 is connected through lead 72 to electrode 13. The center tap of the three-phase source is connected through leads 72a to electrodes 10 and 12.

The three-phase A.C. source 66–68 is adapted to deliver high current and maintain electric arcs between the various electrodes. The arcs are constricted to the vortexes in the whirling gas supplied from the sources 60 and 61, so that the plasma created due to coaction between the electric arcs and the gas has a very high temperature within the torch and when it passes through the nozzle opening 28.

The illustrated three-phase arrangement is one in which phase 66 is connected in both directions between electrodes 10–11 and 11–12. Phases 67 and 68, on the other hand, are only connected in one direction across electrodes 53–10 and 12–13, respectively. To make the system perfectly symmetrical, two additional electrodes (making a total of seven) may be provided at opposite ends of the five electrodes illustrated. Both of such additional electrodes are connected to the common leads 72a, so that each phase is connected in both directions across two sets of electrodes.

Means are provided to effect modulation of the plasma stream at one or more points by modulating the high-current discharges between the various electrodes. Thus, a first modulator 73 and a second modulator 74 are shown as connected, respectively, between electrodes 10 and 11 and electrodes 12 and 13. These modulators may comprise, for example, low-power sources of radio-frequency voltage. The voltages thus superimposed between the electrodes have the effect of modifying the current flowing through the torch and changing the characteristics of the plasma flame or jet in accordance with the characteristics of the modulating source or sources. This affects the current flow in various leads 69, 71 and 72, and the characteristics of the plasma.

*Method with Relation to the Embodiment of FIGURE 5*

In practicing the method with relation to the embodiment of FIGURE 5, gas is introduced from sources 60 and 61 through passage means 58 and 21 into the spaces between the electrodes. It then whirls vortically to define fluid passages or pipes corresponding to the ones shown at 19 in FIGURE 2, after which part of the gas flows out through the passages 24. As previously indicated, the passages 24 may be omitted or altered. Furthermore, water sources such as are numbered 22 in FIGURE 1 may be employed in place of gas sources 61. The various gas sources may deliver the same or different gases, preferably oxidation-preventing gases such as argon, helium, etc.

The three-phase A.C. power source 66–68 is then turned on, and arcs are initiated and maintained between the various electrodes. The constriction of the arcs to the vortexes in the whirling fluid greatly increases the current density and temperature thereof, so that the plasma which passes outwardly through nozzle 13 (or other nozzle) has an extremely high temperature. The plasma also has a high velocity, particularly in cases where a Laval or equivalent nozzle 13 is employed.

As described above, the modulators 73 and 74 are employed to modulate the plasma flow, thereby achieving results including alteration of the flow of much larger currents through circuits including leads 69, 71 and 72.

*Embodiment of FIGURE 6*

FIGURE 6 schematically illustrates an embodiment in which means are provided to direct two plasma streams in opposite directions and into engagement with each other. Means are also provided to pass current, which may be modulated, through the combined plasma streams.

More specifically, two electrical plasma-jet or plasma-flame torches 76 and 77 are each formed with a nozzle electrode 78 and a back electrode 79. Each nozzle electrode is shown as being generally cup-shaped and formed of highly-conductive metal. The radial wall of the nozzle cup has a cylindrical central opening 81 the wall of which is provided with a tubular insert 82 formed of refractory metal such as tungsten. Back electrode 79 is shown as being disc-shaped and as having a central insert 83 also formed of refractory metal. An annular chamber 84 is formed coaxially between the nozzle and back electrodes, being defined by a portion of the nozzle electrode and also by the annular insulator 86 which separates the nozzle and back electrodes.

Gas is introduced tangentially into each chamber 84 for vortical flow therein and subsequent expansion through the nozzle opening 81, such flow being smooth and shock-free due to the presence of the rounded edge 87 at the inner end of each insert 82. The gas is introduced through tangential passage means 88 from a suitable source, not shown.

Chambers 89 and 91 are provided to cool the back and nozzle (front) electrodes, respectively, being adapted to receive water passed therethrough via conduit means 92.

Suitable sources 93 and 94 of direct current are illustrated as connected, respectively, between the electrodes 78 and 79 of each torch 76 and 77. An additional source 95 of direct current is illustrated as connected through leads 96 between the front electrodes 78 of the two torches 76 and 77. In the illustrated arrangement, source 93 delivers positive direct voltage to the back electrode 79 of torch 76, and negative direct voltage to the nozzle electrode 78 of the same torch. Source 94 is shown as delivering positive voltage to nozzle 78 of torch 77 and negative voltage to back electrode 79 thereof. In addition, source 95 is shown as delivering positive voltage to front electrode 78 of torch 76, and negative voltage to front electrode 78 of torch 77.

A suitable modulator 97, for example of relatively high-frequency type, is shown as connected across one of the direct current sources, illustrated as number 94. A suitable capacitor 98 is provided to block flow of direct current through the modulator.

*Method With Relation to the Embodiment of FIGURE 6*

The method with relation to the embodiment of FIG- URE 6 comprises introducing gas, such as argon, through passage means 88 for vortical flow in chambers 84 and expansion through nozzle openings 81. The power sources 93 and 94 are then applied, and electric arcs are struck and maintained between the inserts 82 and 83 of each torch 76 and 77, such arcs being constricted to the vortexes in the whirling gas.

The torches 76 and 77 are so oriented, preferably in coaxial relationship, that plasma streams emanating from the nozzle opening 81 (due to coaction between the gas and the electric arcs) come into contact in the region indicated at 99. A continuous ion path is therefore created between the back electrodes 79 of the two torches 76 and 77.

The D.C. source 95 is then turned on to effect flow of current, preferably a very high current, along the portion of the ion path between the front electrodes 78 of the two torches. This causes a very powerful discharge to be present at 99, outside of the torches, where it can perform many useful functions. Source 95 may be referred to as the "transfer" source, and the arc generated thereby as the "transfer" arc, since the arc is transferred from each torch to an external electrode (which may be a second torch).

Current flow may be modulated by turning on the modulator 97 to apply modulating voltage between two or more of the electrodes. Such voltage is caused to be sufficiently high to affect the overall current flow in the main circuit, thus altering the very high current flowing from source 95 through leads 96. It is within the scope of the invention to employ alternating current instead of direct current, and to apply modulation voltages at other points such as between the two front electrodes 78.

In certain instances it is desirable, in this and other embodiments, to employ pulse sources of current instead of continuous sources. Thus, sources 39–41 (FIG- URE 1) may be replaced by low-inductance capacitors and associated charging and trigger means.

Figure 7:
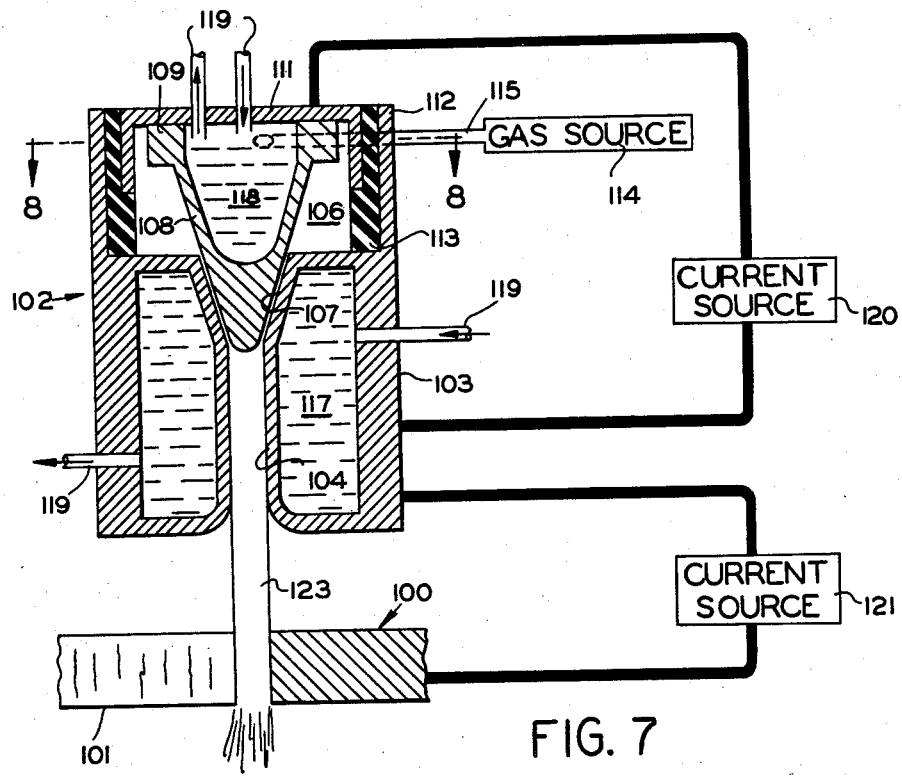
FIGURE 7 is a schematic longitudinal sectional view illustrating a multiple electrode aparatus and method for effecting cutting of a workpiece.
Figure 8:
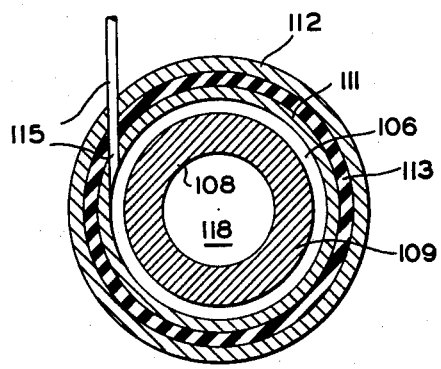
FIGURE 8 is a transverse section taken on line 8—8 of FIGURE 7.

*Embodiment of FIGURES 7 and 8*

Referring next to FIGURES 7 and 8, an embodiment is shown in which (unlike the embodiment of FIGURE 6) the electrode external to the torch is not a part of another plasma torch but is instead a workpiece 100 such as a metal plate to be cut or welded. A cutting operation is schematically illustrated in FIGURE 7, wherein the kerf is indicated at 101.

The plasma torch 102 illustrated in FIGURES 7 and 8 has a non-consumable metal nozzle electrode 103 formed with an elongated cylindrical passage or opening 104. The upper end of passage 104 communicates with a cylindrical gas vortex chamber 106 having a frustoconical central portion or extension. The wall 107 of such central portion or extension merges, at its narrow end, with the wall of passage 104.

The non-consumable metal back electrode 108 of the illustrated torch is conical in shape, the cone angle corresponding generally to that of wall 107. The tip of the back electrode is disposed in the frustoconical extension of the vortex chamber, being spaced from wall 107 to form a frustoconical channel therebetween. The main body of the back electrode is disposed in the main or relatively large portion of vortex chamber 106, and has a radial flange 109 the peripheral wall of which is cylindrical in shape.

Flange 109 seats sealingly against the bottom of an inverted metal cup 111. The wall of cup 111 is telescoped into a generally tubular portion 112 of nozzle electrode 103, there being an insulating sleeve 113 provided between the cup wall and tubular portion 112 in order to maintain the nozzle and back electrodes electrically insulated from each other.

The interior surface of the cup wall, and the exposed interior surface of sleeve 113, are flush with each other and form the cylindrical wall of the vortex chamber. Such cylindrical wall has a diameter substantially greater than the cylindrical wall of flange 109, in order to permit introduction of gas therebetween as will next be described.

Gas is introduced into the chamber 106 from a suitable gas source represented schematically at 114. The gas conduit 115 from source 114 communicates tangentially (FIGURE 8) with chamber 106 at a point located radially-outwardly from flange 109. A suitable gas, such as argon or nitrogen, is thus introduced tangentially so that it will flow vortically around the back electrode 108. The gas then flows vortically and helically through the channel around the tip of the back electrode, and then flows vortically and helically through nozzle passage 104.

The nozzle electrode 103 is formed with an annular cooling chamber 117 around the nozzle passage and also around wall 107. Water is passed through such chamber, and through a cooling chamber 118 in back electrode 108, by means of conduits illustrated at 119.

A first current source 120 (which may be termed the torch current source) is connected between the nozzle and back electrodes. A second and separate current source 121 (which may be termed the transfer current source) is connected between the nozzle electrode and workpiece 100. Such current sources are adapted to supply very high currents, on the order of hundreds of amperes. Either or both of the current sources may be a single or multi-phase A.C. source, instead of being a D.C. source. Where D.C. sources are employed, source 120 is preferably connected with its negative terminal to back electrode 108. Source 121 is preferably connected with its negative terminal to nozzle 103.

In performing the method of the embodiment illustrated in FIGURES 7 and 8, water is passed continuously through chambers 117 and 118 by means of conduits 119, and gas is introduced tangentially from source 114 into the vortex chamber 106. Torch current source 120 is then applied to strike and maintain an arc between electrode 108 and the wall of nozzle passage 104. Such arc is blown downstream by the gas, the downstream terminus or foot-point of the arc being spaced a substantial distance from the tip of electrode 108. It is pointed out, however, that the entire arc is disposed in nozzle passage 104.

The second or transfer current source 121 is then applied to form a second and separate arc which passes between nozzle electrode 103 and workpiece 100. The second arc, instead of passing between various uncontrolled portions of the nozzle and the work, follows the ionized gas or plasma emanating from nozzle passage 104. Stated otherwise, the transfer arc uses as a pipe or conduit the plasma generated by torch 102. Such second arc, together with the stream of ionized gas or plasma from torch 102, is indicated at 123 in FIGURE 7.

As previously indicated, the amount of power supplied to the torch and transfer arcs by sources 120 and 121 may be very large. The heating effect produced on workpiece 100 is thus great, so that the speed of the operation is very substantial.

Figure 9:
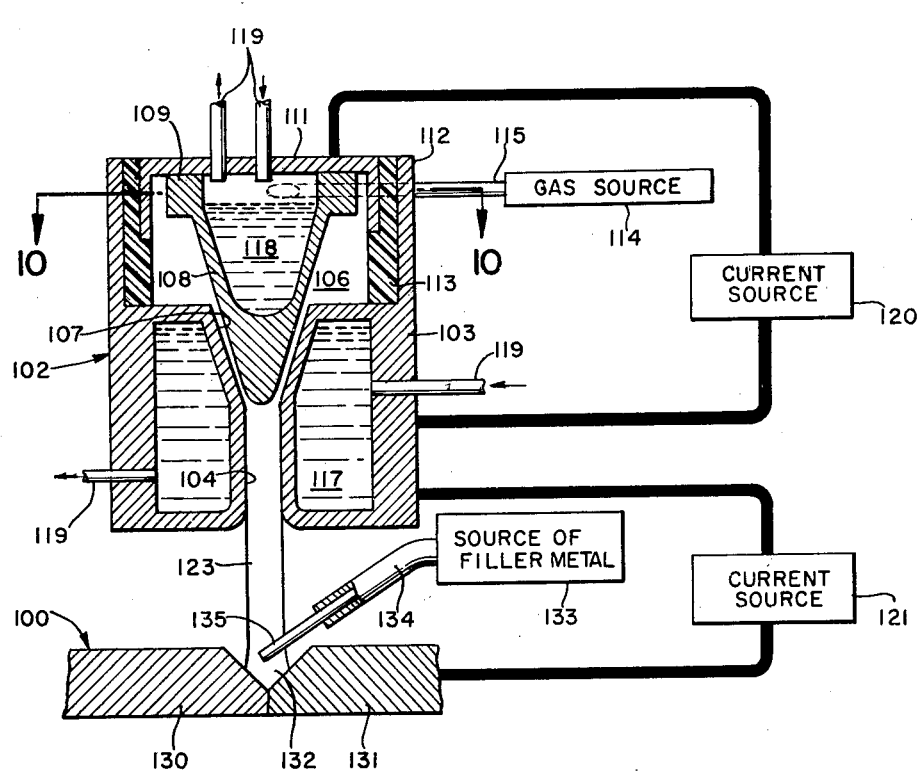
FIGURE 9 is a view corresponding generally to FIGURE 7 but illustrating the welding of a workpiece.
Figure 10:
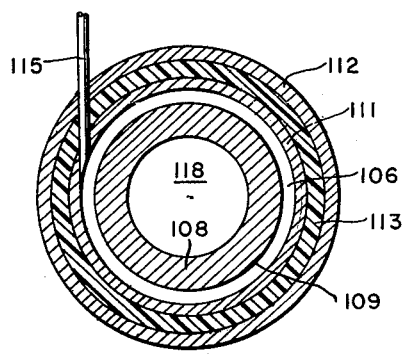
FIGURE 10 is a transverse section taken on line 10—10 of FIGURE 9.

*Embodiment of FIGURES 9 and 10*

The torch 102 illustrated in FIGURES 9 and 10 may be identical or substantially identical to the one described relative to FIGURES 7 and 8. It has, accordingly, been given the same reference numerals.

The transfer current source 121 shown in FIGURE 9 is not connected to a continuous plate, being instead connected to one of two abutted metal plates 130 and 131 which it is desired to weld together. Such plates may be beveled, as indicated, to form the usual V-shaped groove 132.

A suitable source 133 of filler metal is connected to a conduit or guide 134 through which filler metal may be fed to groove 132. For example, source 133 may be adapted to feed filler wire 135 to the weld puddle in the V-groove. Source 133 may also be adapted to deliver metal powder to the weld puddle in the V-groove. It is to be understood that various conventional shielding gases, granular or liquid fluxes, etc., may be supplied to the welding area for purposes including prevention of oxidation of the workpiece.

In performing the method of the embodiment of FIGURES 9 and 10, the torch 102 is employed to generate a plasma jet which is directed into the groove 132 (or at the junction of any two members to be welded). Source 121 is then employed to maintain a transfer arc through the plasma jet, from electrode 103 to the work. The magnitude of the current supplied by source 121, the distance between torch and work, the rate of traverse, and other factors, are so regulated that the abutted regions of plates 130 and 131 fuse to a substantial depth or penetration. Filler metal is supplied from source 133, at a suitable rate, and appropriate materials are employed to prevent oxidation. Suitable chill means, not shown, may also be employed.

It has been found that the present method, wherein the transfer arc is external to the torch instead of extending to the back electrode 108, produces particular advantages in welding and other applications in which removal of metal is not desired. One reason for this is that a large transfer energy may be applied without increasing the velocity of the jet emanating from the torch. In torches wherein the transfer arc extends to the rear electrode, on the other hand, application of a large transfer energy heats the gas in the nozzle passage (such as 104) to such a degree that it expands greatly and discharges at high velocities. The result is that the molten metal adjacent rear electrode-to-work transfer torches is blasted or splattered to undesired locations.

It might be supposed that when the torch arc and transfer arc in the present system are equal in magnitude, or when the transfer arc is less than the torch arc, the velocity of the gas emanating from the torch would be as high as in rear electrode-transfer torches. This is not the case, however, since the gas velocity in the present system is still distinctly lower. The reason for this phenomenon is not completely understood, but it is pointed out that in the present system the transfer arc is not at all constricted in the nozzle passage, being entirely an open arc.

It is pointed out, relative to the embodiments of FIGURES 7-10, that the torch arc is normally and preferably the primary or larger arc, and the transfer arc is normally and preferably the secondary or smaller arc. The amount of current supplied by current source 120 is made greater than the amount of current supplied by source 121. It has been found that when the ratio of transfer current to torch current approaches or exceeds unity, the external arc and jet 123 fans or spreads out in a manner which is normally undesirable.

A highly important advantage of systems connected as indicated in FIGURES 6-10 is that the transfer energy may be controlled with great ease and precision, independently of the torch energy. Thus, factors such as depth of penetration may be adjusted accurately, without changing the velocity of the gas. Furthermore, no energy is lost in control impedances.

It is emphasized that the electrical connections indicated in FIGURE 6-10 may be utilized for purposes other than cutting and welding. They are suitable and highly desirable for numerous additional applications in which it is desired to heat an electrically-conductive workpiece, whether or not all or part of such workpiece is fused.

As a specific example of the embodiment of FIGURES 9 and 10, let it be assumed that it is desired to weld two ½ inch mild steel plates (such as 130 and 131). The nozzle electrode of the torch is then oriented between about one and two inches from the junction between the plates, the torch having a nozzle passage diameter of $5/16$ inch. Six standard cubic feet per hour of argon are passed from source 114 through the torch, and torch current source 120 (a D.C. power supply) is applied with its negative terminal connected to electrode 108. Source 120 is adapted to maintain a 200 ampere torch arc, at about 22 volts.

Transfer source 121, also a D.C. power supply, is connected with its positive terminal to the work 131, and is adapted to supply 160 amperes at about 25 volts. A suitable shielding gas source (not shown) is employed to blanket the welding area with argon, and filler metal is supplied at a rate adapted to fill the V-groove 132.

It is pointed out that two separate and distinct arcs are present in the embodiments of FIGURES 6-10, one arc being from back electrode to nozzle, the other being from nozzle to work. Thus, there is no change in the magnitude of the current flowing in leads connected to source 120 when source 121 is applied. Stated otherwise, the torch arc magnitude is independent of the transfer arc.

Because of the use of vortically-flowing gas, important advantages are achieved relative to such factors as increasing the voltage and power capabilities of the system, increasing the efficiency of the operation, stabilizing the torch arc, and making reasonable the manufacturing tolerances relative to centering of the back electrode.

Various embodiments of the present invention, in addition to what has been illustrated and described in detail, may be employed without departing from the scope of the accompanying claims.

We claim:

1. A plasma apparatus, which comprises first and second electrodes mounted in spaced and insulated relationship, a third electrode mounted between said first and second electrodes and insulated therefrom, orifice means provided in said third electrode through which plasma may pass in traveling between said first and second electrodes, means to generate a high-current electric arc between each of said electrodes and at least one other one of said electrodes, and means to effect constriction of at least one of said electric arcs to a cross-sectional area substantially smaller than it would normally occupy in space, thereby increasing the current density and temperature thereof, said last-named means including means to rapidly circulate a fluid vortically around at least said one arc to thereby constrict the same to the vortex in said circulating fluid.

2. An electrical plasma apparatus, which comprises at least three electrodes mounted in mutually insulated relationship, at least one of said electrodes defining a nozzle opening, means to supply multi-phase alternating current to said electrodes to effect maintenance of high-current electric arcs therebetween, and means to pass gas through said nozzle opening for conversion to high-temperature plasma.

3. The invention as claimed in claim 2, in which means are provided to circulate fluid rapidly around at least one of said arcs to constrict the same and increase the current density and temperature thereof.

4. An electrical plasma apparatus, which comprises at least three electrodes mounted in spaced, coaxial relationship and insulated from each other, orifice means provided in at least two adjacent ones of said electrodes, means to effect axial flow of gas at high velocity through said orifice means in said two adjacent electrodes and in a direction away from the remaining electrode, said last-named means including means to effect high-current electric discharges between said electrodes to thereby effect heating of said gas into plasma, and means to create fluid pipes between said electrodes and coaxial with said orifice means whereby said discharges are constricted to said fluid pipes or passages, said last-named means including means to circulate fluid at high velocity and in a vortical manner to thereby form said fluid pipes or passages in the resulting vortexes.

5. The invention as claimed in claim 4, in which said means to maintain said electric discharges includes a plurality of direct current sources each of which is connected between two electrodes.

6. The invention as claimed in claim 4, in which means are provided to introduce fluid material into said plasma for melting or vaporization thereby.

7. The invention as claimed in claim 4, in which said means to maintain said electric discharges includes a multi-phase source of alternating current having various phases connected between various ones of said electrodes.

8. A method of creating a high-temperature high-velocity jet of electrical plasma, which comprises providing at least three electrodes, impressing separate voltage sources across different ones of said electrodes to effect a high-current electric discharge between each of said electrodes and at least one other one of said electrodes, causing the presence of gas or vapor between said electrodes and in the vicinity of said discharges to thereby effect conversion of said gas to plasma, and fluid-constricting at least one of said discharges to thereby increase the current density and temperature thereof.

9. A method of creating a high temperature, which comprises providing a back electrode and a nozzle electrode in spaced and insulated relationship, maintaining an electric arc between said electrodes in the vicinity of the nozzle opening in said nozzle electrode, circulating fluid around said arc between said electrodes in a manner effecting gas-constriction of said arc to a cross-sectional area substantially smaller than it would normally occupy in space to thereby effect passage of high-temperature plasma through said nozzle opening in a direction away from said back electrode, directing said plasma toward an additional electrode disposed on the side of said nozzle electrode remote from said back electrode, and impressing a voltage between said additional electrode and at least one of said back and nozzle electrodes sufficient to maintain an arc therebetween passing along said plasma.

10. A multi-electrode electrical plasma-jet apparatus, comprising wall means to define a continuous elongated chamber, said wall means having an opening at at least one end thereof, at least four electrodes disposed in said chamber in spaced relationship, at least three of said electrodes having coaxial openings therethrough communicating with said open end of said wall means, means including separate current sources to maintain an electric arc between each of said electrodes and at least one other of said electrodes, and means to effect flow of fluid between said electrodes to stabilize said arcs and effect passage of a high-velocity high-temperature electrical plasma jet through said electrode openings and out said open end of said wall means.

11. A method of heating a portion of a metal workpiece, which comprises employing an electrical plasma-jet torch to generate a stream of ionized gas, directing said stream against said workpiece, maintaining a high-power electric arc through said stream between said workpiece and a non-consumable annular electrode which is disposed around said stream in spaced relationship from said workpiece, and so locating said annular electrode that substantially all portions of said arc are disposed externally of said torch.

12. A method of melting a portion of a metal workpiece, which comprises providing a plasma torch having nozzle and back electrodes, maintaining an arc entirely within said torch and between said nozzle and back electrodes at the nozzle opening in said nozzle electrode, passing gas through said torch and out said nozzle opening to the vicinity of said workpiece, and effecting flow of electric current externally of said torch through said gas to said workpiece, said current flowing in a circuit which includes a non-consumable electrode and said workpiece and is independent of said back electrode, said current being sufficiently large to effect melting of at least a portion of said workpiece.

13. A plasma torch, which comprises at least three electrodes arranged in spaced relationship along a predetermined path, at least two of said electrodes being non-consumable and having openings therein through which said path extends, means to effect flow of gas along said path, a first current source connected between a first pair of said electrodes to maintain an arc therebetween through the gas flowing along said path, and a second current source connected between a second pair of said electrodes to maintain an arc therebetween through the gas flowing along said path, said second source being independent of said first current source whereby said arcs may be independently and efficiently controlled.

14. Apparatus for heating a metal workpiece, which comprises electric torch means having a nozzle electrode and a back electrode, means to maintain an electric arc within said torch means and between said nozzle electrode and said back electrode, means to pass gas through said torch means and out the nozzle opening in said nozzle electrode, said gas being heated by said arc, and means to create an electric discharge externally of said torch means through said heated gas, said last-named means including a power source connected between a workpiece and a portion of said torch means downstream from said back electrode.

15. A method of heating a predetermined region to a very high temperature, which comprises providing first and second electrical plasma-jet torches, directing the plasma jets from said torches into proximity with each other at a predetermined region, and maintaining a high-current electric arc through said plasma jets to thereby heat said predetermined region to a very high temperature.

16. The invention as claimed in claim 15, in which said method comprises maintaining said arc by means of an electric circuit including the nozzle electrodes of said first and second torches.

17. The invention as claimed in claim 15, in which said method comprises directing said plasma jets from said torches in opposite directions along a substantially straight-line path and into engagement with each other.

18. A method of cutting an electrically-conductive workpiece, which comprises providing an electrical plasma-jet torch having a nozzle electrode and a back electrode, maintaining a first arc entirely within said torch between said nozzle and back electrodes, at least a portion of said first arc being disposed in the nozzle passage in said nozzle electrode, passing gas through said torch and out said nozzle passage to the vicinity of an electrically-conductive workpiece, said gas being heated by said first arc to form plasma, maintaining a second arc through said plasma by means of an electric circuit which includes said workpiece and is independent of said back electrode, and causing the power of said first and second arcs and the rate of flow of said gas to be sufficient to effect cutting of said workpiece.

19. The invention as claimed in claim 18, in which said method comprises maintaining said second arc through said plasma by means of an electric circuit which includes said nozzle electrode.

20. A method of welding together first and second metal workpieces, which comprises bringing said workpieces into abutment with each other along a predetermined region, bringing the plasma jet from an electrical plasma-jet torch into impingement with said workpieces at said region, maintaining a high-current transfer electric arc through said jet by means of an electric circuit which includes at least one of said workpieces and is independent of the back electrode of said torch, regulating factors including the power in said transfer arc to effect fusion of adjacent portions of said workpieces at said region, and supplying filler metal to said fused portions of said workpieces.

21. The invention as claimed in claim 20, in which said method comprises maintaining said transfer electric arc through said jet by means of an electric circuit including said workpieces and a non-consumable nozzle electrode of said torch.

22. An electrical plasma torch system, which comprises a substantial number of non-consumable electrodes mounted in axially-spaced relationship along a predetermined path, at least the intermediate ones of said electrodes having openings therein for passage of gas therethrough, means to effect flow of gas along said path and through said openings, a first power supply connected across two adjacent ones of said electrodes to maintain an arc therebetween through said gas, and a second power supply connected across two adjacent ones of said electrodes to maintain an arc therebetween through said gas, at least one of the electrodes to which said first power supply is connected being independent of said second power supply.

23. An electrical plasma torch system, which comprises a substantial number of non-consumable electrodes mounted in axially-spaced relationship along a predetermined path, at least the intermediate ones of said electrodes having openings therein for passage of gas therethrough, means to effect flow of gas along said path and through said openings, an alternating-current power supply having at least two phases, first circuit means to connect one phase of said power supply across two of said electrodes to maintain an arc therebetween through said gas, and second circuit means to connect another phase of said power supply across two of said electrodes to maintain an arc therebetween through said gas, at least one of the electrodes to which said first circuit means is connected being independent of said second circuit means.

24. A method of heating an electrically-conductive workpiece, which comprises providing an electrical torch incorporating a back electrode and a second and non-consumable electrode having an opening therethrough, maintaining a first electric arc entirely within said torch and having one terminus at said back electrode, passing gas from the vicinity of said back electrode through said first arc and said opening to the vicinity of said workpiece, said gas being heated and ionized by said first arc, maintaining a second arc through said gas between said second electrode and said workpiece, and regulating the power supplied to said first and second arcs in such manner that the current in said first arc is substantially equal to or greater than the current in said second arc.

25. A method of heating an electrically-conductive workpiece, which comprises providing an electrical torch incorporating a back electrode and a second and non-consumable electrode having an opening therethrough, maintaining a first electric arc entirely within said torch and having one terminus at said back electrode, passing gas vortically around said first arc whereby said gas flows from the vicinity of said back electrode through said first arc and said opening to the vicinity of said workpiece, said gas being heated and ionized by said first arc, and maintaining a second arc through said gas between said second electrode and said workpiece.

26. A method of heating an electrically-conductive workpiece, which comprises providing an electrical torch incorporating a back electrode and a second and non-consumable electrode having an opening therethrough, maintaining by means of a first independently-controllable current source a first electric arc entirely within said torch and having one terminus at said back electrode, passing gas from the vicinity of said back electrode through said first arc and said opening to the vicinity of said workpiece, said gas being heated and ionized by said first arc, and maintaining by means of a second and separate independently-controllable current source a second arc through said gas between said second electrode and said workpiece.

References Cited in the file of this patent

UNITED STATES PATENTS

| | | |
|---|---|---|
| 2,508,954 | Latour et al. | May 23, 1950 |
| 2,858,411 | Gage | Oct. 28, 1958 |
| 2,906,858 | Morton | Sept. 29, 1959 |
| 2,922,869 | Giannini et al. | Jan. 26, 1960 |
| 2,945,119 | Blackman | July 12, 1960 |
| 2,982,845 | Yenni et al. | May 2, 1961 |